United States Patent
Blom (10) Patent No.: US 9,408,277 B2
(45) Date of Patent: Aug. 2, 2016

(54) CONTROL CIRCUIT FOR A PHASE-CUT DIMMER AND A METHOD OF CONTROLLING A PHASE-CUT DIMMER

(71) Applicant: Silergy Corp., Grand Cayman, Cayman Islands (GB)

(72) Inventor: Anton Cornelis Blom, Eindhoven (NL)

(73) Assignee: Silergy Corp., Cayman Islands (GB)

(*) Notice: Subject to any disclaimer, the term of this patent is extended or adjusted under 35 U.S.C. 154(b) by 421 days.

(21) Appl. No.: 13/868,501

(22) Filed: Apr. 23, 2013

(65) Prior Publication Data

US 2013/0307430 A1   Nov. 21, 2013

(30) Foreign Application Priority Data

May 18, 2012   (EP) .................................... 12168476

(51) Int. Cl.
*H05B 37/02* (2006.01)
*H05B 39/02* (2006.01)
*H05B 39/04* (2006.01)
*H05B 41/36* (2006.01)
*H05B 33/08* (2006.01)

(52) U.S. Cl.
CPC ............ *H05B 37/02* (2013.01); *H05B 33/0815* (2013.01); *H05B 33/0845* (2013.01)

(58) Field of Classification Search
CPC ........... H05B 33/0815; H05B 33/0845; H05B 41/2806; H05B 33/0809; H05B 33/0848; H05B 41/38; H05B 33/0851; H05B 33/0812; H05B 37/02
USPC ................... 315/200 R, 209 R, 291, 307, 312
See application file for complete search history.

(56) References Cited

U.S. PATENT DOCUMENTS

| 2007/0182338 A1 | 8/2007 | Shteynberg et al. |
| 2010/0259185 A1 | 10/2010 | Sadwick et al. |
| 2011/0140628 A1 | 6/2011 | Lei et al. |

FOREIGN PATENT DOCUMENTS

WO   2011/042510 A2   4/2011

OTHER PUBLICATIONS

Extended European Search Report for European Patent Appln. No. 12168476.5 (Oct. 8, 2012).

*Primary Examiner* — Lincoln Donovan
*Assistant Examiner* — Diana J Cheng (57) ABSTRACT

A control circuit is disclosed for lighting applications having a load and an AC leading-edge phase-cut dimmer comprising a phase-cutting switch, the circuit comprising: a detection circuit for detecting a deadlock state of the dimmer; and an activation circuit configured to, in response to the detection circuit detecting a deadlock state of the dimmer, supply a DC current to the dimmer to exit the deadlock state by activating the dimmer. A method of operating such a control circuit is also disclosed.

15 Claims, 7 Drawing Sheets

CONTROL CIRCUIT FOR A PHASE-CUT DIMMER AND A METHOD OF CONTROLLING A PHASE-CUT DIMMER

CROSS-REFERENCE TO RELATED APPLICATIONS

This application claims the priority under 35 U.S.C. §119 of European patent application no. 12168476.5, filed on May 18, 2012, the contents of which are incorporated by reference herein.

FIELD OF THE INVENTION

This invention relates to control circuits for lighting applications having a load and a phase-cut dimmer. It further relate to methods of controlling such circuits.

BACKGROUND OF THE INVENTION

As an example of a control circuit for a load having a phase cut dimmer, consider without limitation a lighting circuit having at least one lamp and being operable with dimmer circuit such as a wall mounted dimmer. It is typically possible to deeply dim the lamp, that is to say to adjust the phase cut dimmer to a low conduction angle. However, when operating the load at low conduction angle, the dimmer is generally very sensitive to mains voltage fluctuations, the reasons for which will be explained in more detail hereinbelow. In particular, a voltage dip may cause the dimmer to switch off, since the phase-cutting device in the dimmer—typically a triac—may not trigger. A deadlock situation can arise, in that the dimmer will not restart, even after the end of the voltage dip; to restart the dimmer, the conduction angle setting is increased significantly, that is to say the user has to turn up the lighting level.

A similar problem can occur when a dimmer is switched on at a very low conduction angle, if the moment of switch-on corresponds to an inappropriate part of the AC phase. Again, the dimmer setting has to be increased to a significantly higher conduction angle before the lamp starts operating.

It would be desirable to avoid, or to reduce, the need to increase the conduction angle necessary to start or restart the lamp.

SUMMARY OF THE INVENTION

According to a first aspect, there is provided a control circuit for lighting applications having a load and an AC leading-edge phase-cut dimmer comprising a phase-cutting switch, the circuit comprising: a detection circuit for detecting a deadlock state of the dimmer; and an activation circuit configured to, in response to the detection circuit detecting a deadlock state of the dimmer, supply a DC current to the dimmer to exit the deadlock state by activating the dimmer. The phase-cutting switch may be a combination of a diac and triac, in which case the control terminal of the phase-cutting switch may be the input terminal of the diac. Thus, according to this aspect, it may not be necessary for a user to adjust the dimmer in order to restart the dimmer; rather the control circuit may detect a problem state or an emerging deadlock, and provide suitable control to exit the deadlock, by adjusting a current supplied to the dimmer In embodiments, in the deadlock state, the voltage at a control terminal of the phase-cutting switch does not reach a predetermined trigger level required to turn on the switch.

In embodiments, supplying a DC current to the dimmer comprises increasing a voltage at the control terminal of the phase-cutting switch.

In embodiments, the detection circuit is configured to sense a voltage across the load. In other embodiments, the detection circuit is configured to sense a voltage across the dimmer. In embodiments the detection circuit is configured to sense a current through at least one of the group consisting of the load, the dimmer, and the activation circuit.

In embodiments, the phase of the leading edge is determined by a timing capacitor, and in embodiments the detection circuit is configured to detect the voltage on the timing capacitor.

In embodiments the activation circuit comprises a semiconductor switch arranged to be, in use, electrically coupled in series with the phase-cut dimmer and the load and is configured so as to supply the DC current when the semiconductor switch is open. In embodiments the activation circuit is configured to supply the DC current by at least half-rectifying the AC supply by means of a body diode of a semiconductor switch. This is particularly convenient, in the case of a MOSFET switch with a suitable diode.

In embodiments the load comprises a load driver circuit, the detection circuit and the activation circuit are comprised in the load driver circuit and the detection circuit detects a voltage across the load. In embodiments the activation circuit comprises a thyristor forming one leg of a bridge rectifier. In such embodiments, the detector and activator may be more closely associated with the load, than with the supply, and thus might, for example, be co-packaged with the driver for the load, for instance in the case of an LED load and a driver which requires a DC input. In such embodiments, multiple loads could correspond to multiple control circuits.

In embodiments the phase-cutting switch is one of the group consisting of a triac, a thyristor, a bipolar transistor, a power MOSFET and an IGBT.

According to another aspect there is provided a method of controlling a dimmer circuit for lighting applications and comprising a dimmer comprising a phase-cutting switch; the method comprising detecting a deadlock state of the dimmer by means of a detection circuit; and, in response to the detection circuit detecting a deadlock state of the dimmer, supplying a DC current to the dimmer.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

Figure 1:
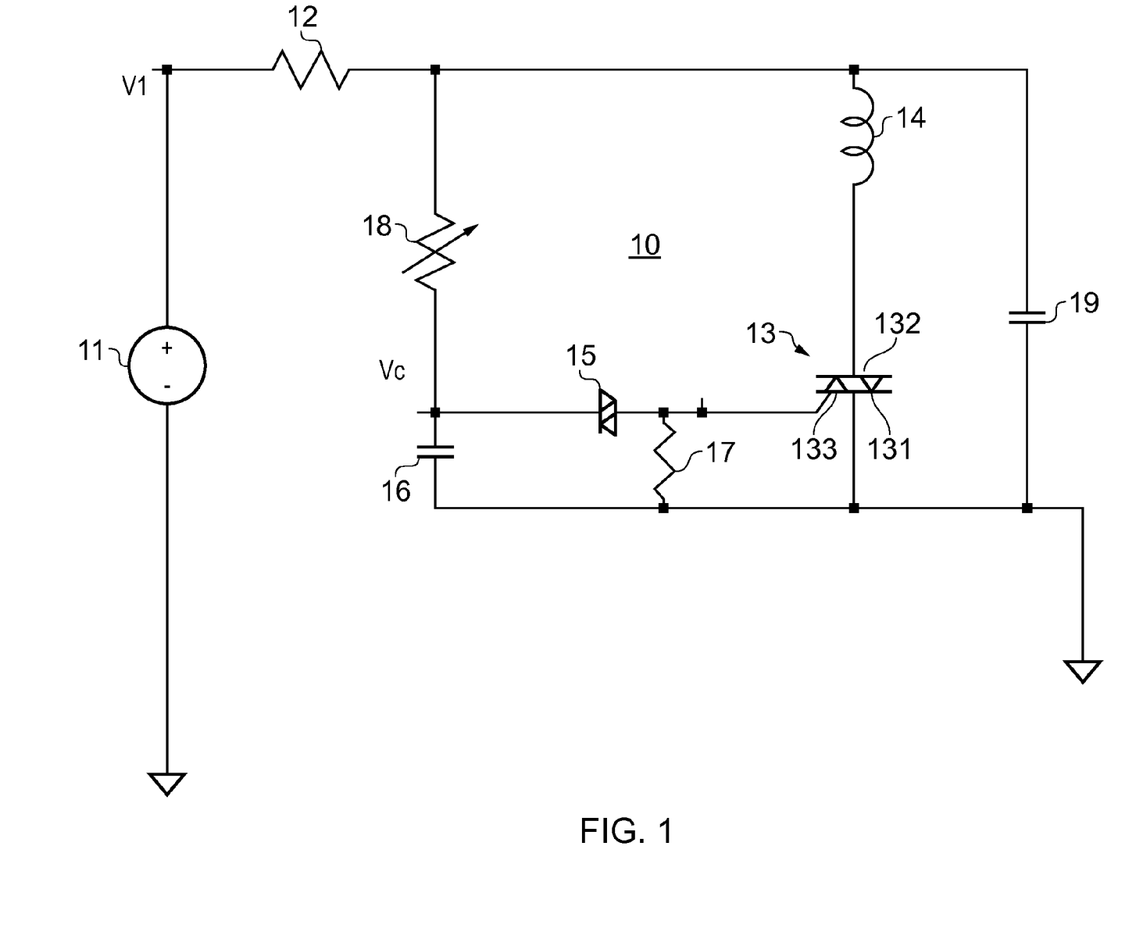
FIG. 1 shows a schematic of an example leading-edge AC phase cut dimmer connected to an AC supply and a load.

FIG. 1 shows a schematic of an example leading-edge AC phase cut dimmer 10 connected an AC supply 11 and a load 12. The load is typically a lighting circuit. The dimmer circuit 10 comprises a triac 13, connected in series, by its main terminals 131 and 132, with an inductor 14. A smoothing capacitor 19 is connected in parallel with the series-connected triac and inductor. The control terminal 133 of the triac is connected to one terminal of a diac 15. The other terminal of the diac is connected to a timing capacitor 16. A resistor 17 may be connected in series with the timing capacitor in order to avoid bounce and false triggering. The timing capacitor 16 is charged through a variable resistor 18. In a typical wall-mounted dimmer the variable resistor 18 is the user-controlled knob.

Figure 2:
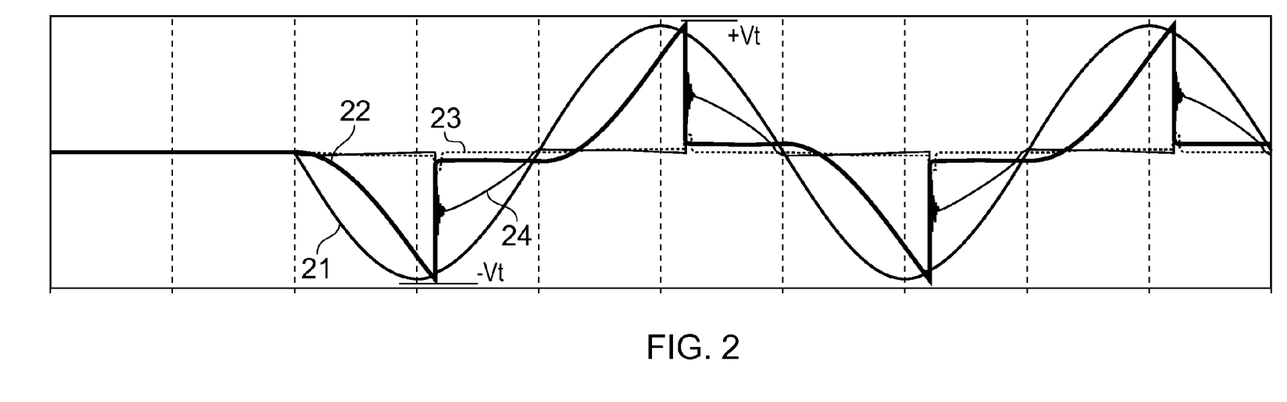
FIG. 2 shows waveforms associated with initial normal operation of the dimmer when switched on at a 0° phase angle of the AC supply.

FIG. 2 shows waveforms associated with initial normal operation of the dimmer of FIG. 1, when switched on at a 0° phase angle of the AC supply. The figure shows the AC supply voltage 21, the voltage at the input to the diac 22, which also corresponds to the voltage Vc across the capacitor 16, the gate voltage 23 of the triac 13, and the current 24 through the load 12. Initially, the circuit is started at a 0° phase angle, and both the diac and the triac are off. A relatively small current passes through the load 12 and the variable resistor 18 to charge the capacitor 16. The rate of charging of, that is to say the rate of change of voltage across, the capacitor depends on the setting of the variable resistor 18 (together with the relatively low load resistance), and the AC supply voltage. As shown, at a phase angle of approximately 110°, the voltage across the capacitor is sufficient to switch on the diac 15, which in turn provides a sufficient gate voltage to the triac to trigger the triac, which then latches on. The triac, in its on-state, provides a low resistive path to the load, with only the inductor 14 in series. As will be familiar to the skilled person, inductor 14 co-operates with capacitor 19 to reduction line distortion and electromagnetic interference (EMI).

Figure 3:
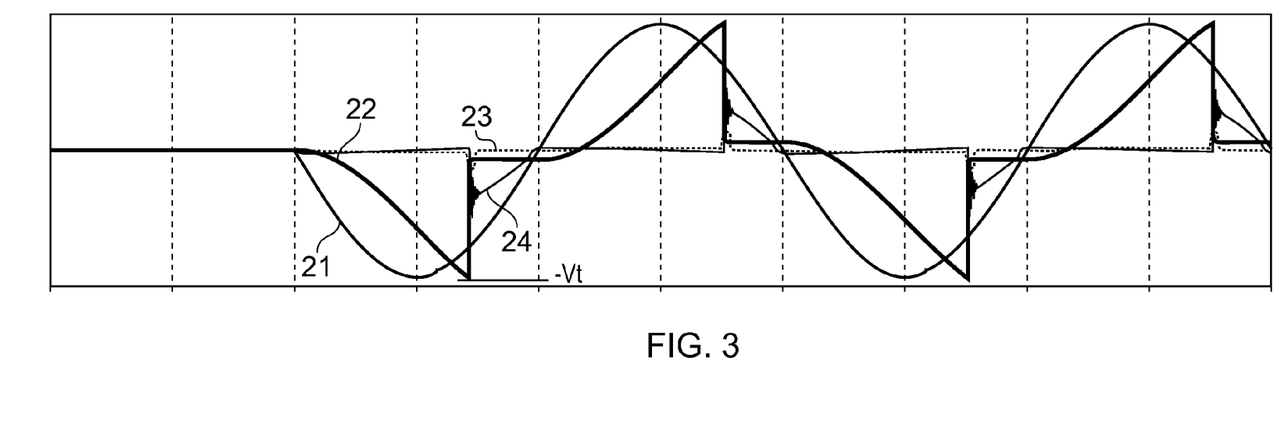
FIG. 3 shows waveforms associated with in initial normal operation of the dimmer when switched on at a 90° phase angle of the AC supply.

A higher resistance value for the resistor 18 results in a slower charging of the capacitor 16, resulting in a later switch on of the triac, that is to say a deeper dimming of the lamp in the case of a lighting application. An example is shown in FIG. 3 where the variable resistance value is increased by one third compared with the situation in FIG. 2. The same waveforms are shown, and it is apparent from the shape of the capacitor voltage 22 that the capacitor is charged more slowly, such that it does not reach the trigger voltage until a phase angle of approximately 135°. However, at this point the triac is properly triggered as shown by waveforms 23 and 24.

Figure 4:
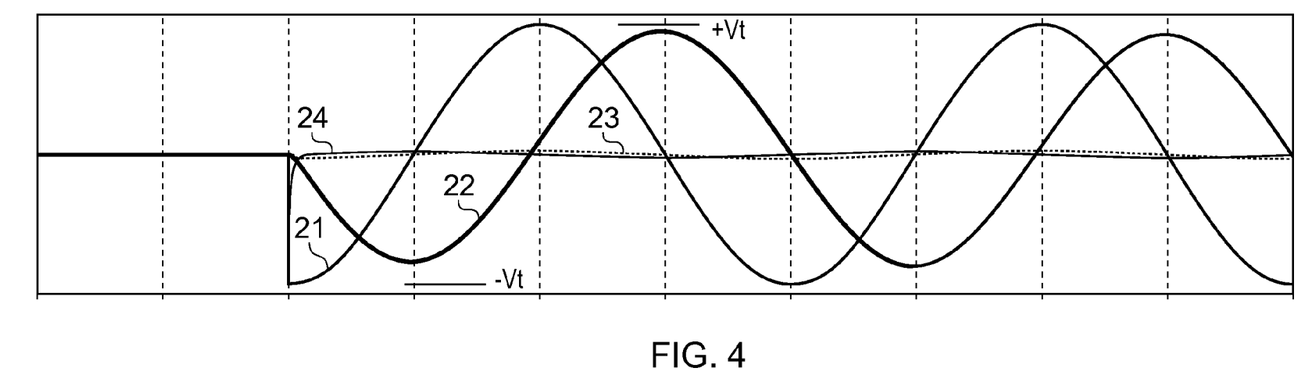
FIG. 4 shows waveforms associated with the dimmer in a deadlock state when switched on at a 90° phase angle of the AC supply.

FIG. 4 shows waveforms associated with in initial normal operation of the dimmer when switched on at a 90° phase angle of the AC supply, and demonstrates an example of the deadlock status which can arise: the circuit is switched on at a 90° phase angle of the supply, and as shown by waveform 22, the capacitor immediately start charging and the voltage across it increases. However, since the peak of the AC waveform has already been reached, the rate of charge of the capacitor is slowing, until it stops charging when the AC supply reaches a zero crossing. At that point, the capacitor starts to discharge. However, as is clear from the figure, up to that time the voltage across the capacitor has not reached the trigger voltage, so the triac is not triggered. During the subsequent half cycle of VAC supply, the supply voltage is in the opposite sense such that the capacitor is first discharged until there is no charge across it, and subsequently charges in the opposite direction (that is to say, if initially it is charged positively, then in the second half cycle it is charged negatively, and vice versa). However, as is again clear from the figure, during that AC supply half-cycle, since the capacitor initially has to discharge before charging, the absolute value of the voltage across it once again does not reach the trigger voltage. Thus the dimmer has entered a deadlock state, in which, although the capacitor is continuously charged and discharged according to the half cycle is of the AC supply, the voltage across it never reaches the trigger voltage, due to the initial charge (of the wrong type) which is stored in it.

Figure 5:
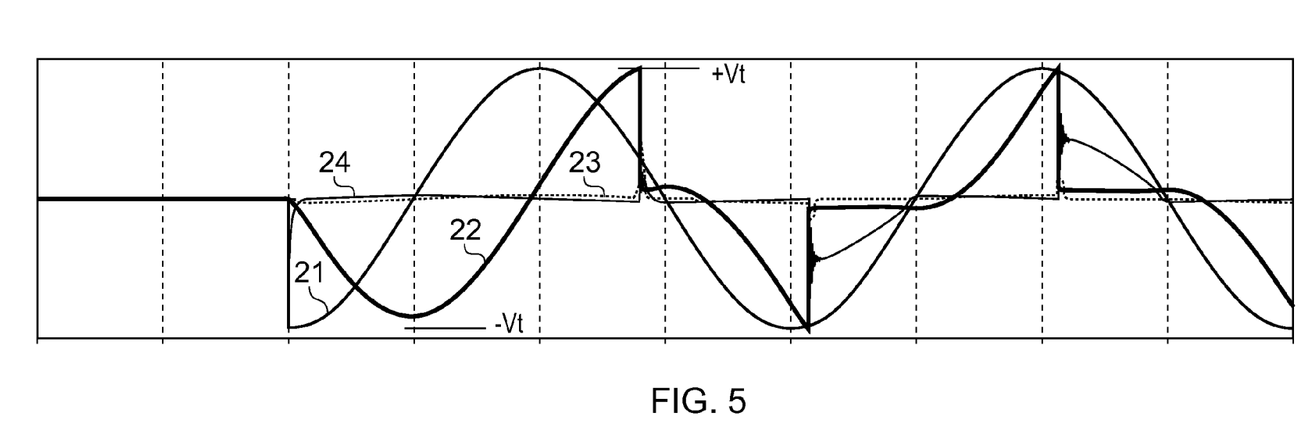
FIG. 5 shows waveforms associated with the dimmer operated in known ways to overcome the deadlock.

FIG. 5 shows waveforms associated with the dimmer operated in known ways to overcome the deadlock. Essentially, the known method of overcoming or avoiding this deadlock state is to reduce the resistance of the variable resistor, that is, to reduce the depth of dimming. In practice, a user must turn up the knob to increase the nominal or anticipated light level. At FIG. 5 this results in the gradient of the voltage 22 across the capacitor changing more rapidly than in the corresponding FIG. 4. Although the voltage does not reach the trigger voltage during the first AC supply half-cycle, due to the increased gradient during the second half cycle the absolute voltage does reach Vt as shown, which then prompts triggering of the diac and triac and normal operation can resume. This may require adjusting the variable resistance a significant amount—as shown in the figure the phase edge is shifted from about 135° to about 100°. Of course, the skilled person will appreciate that the 135° phase edge is a nominal value, since in practice no phase edge is achieved at all.

Another circumstance in which a deadlock can occur is that of a temporary under-voltage of AC supply. Since the rate of charging of the timing capacitor depends on the supply voltage as well as the value of the variable resistor, in the case of a temporary under-voltage of the A/C supply, even if the under-voltage is insufficient to cause a brownout condition, the charging of the capacitor may be reduced such that it does not reach the trigger voltage within the supply half cycle. Similarly to the situation described above with reference to FIG. 4, the charge on the capacitor then has to be discharged during a first part of the subsequent half cycle prior to the capacitor being charged in the opposite direction. Again, due to this "wrong" charge on the capacitor the voltage across the capacitor may never reach the trigger voltage and so dimmer enters the deadlock state. Because of the necessity to discharge the incorrect charge before properly charging the capacitor during each half cycle, the deadlock state may continue even beyond the under-voltage of the AC supply.

Figure 6:
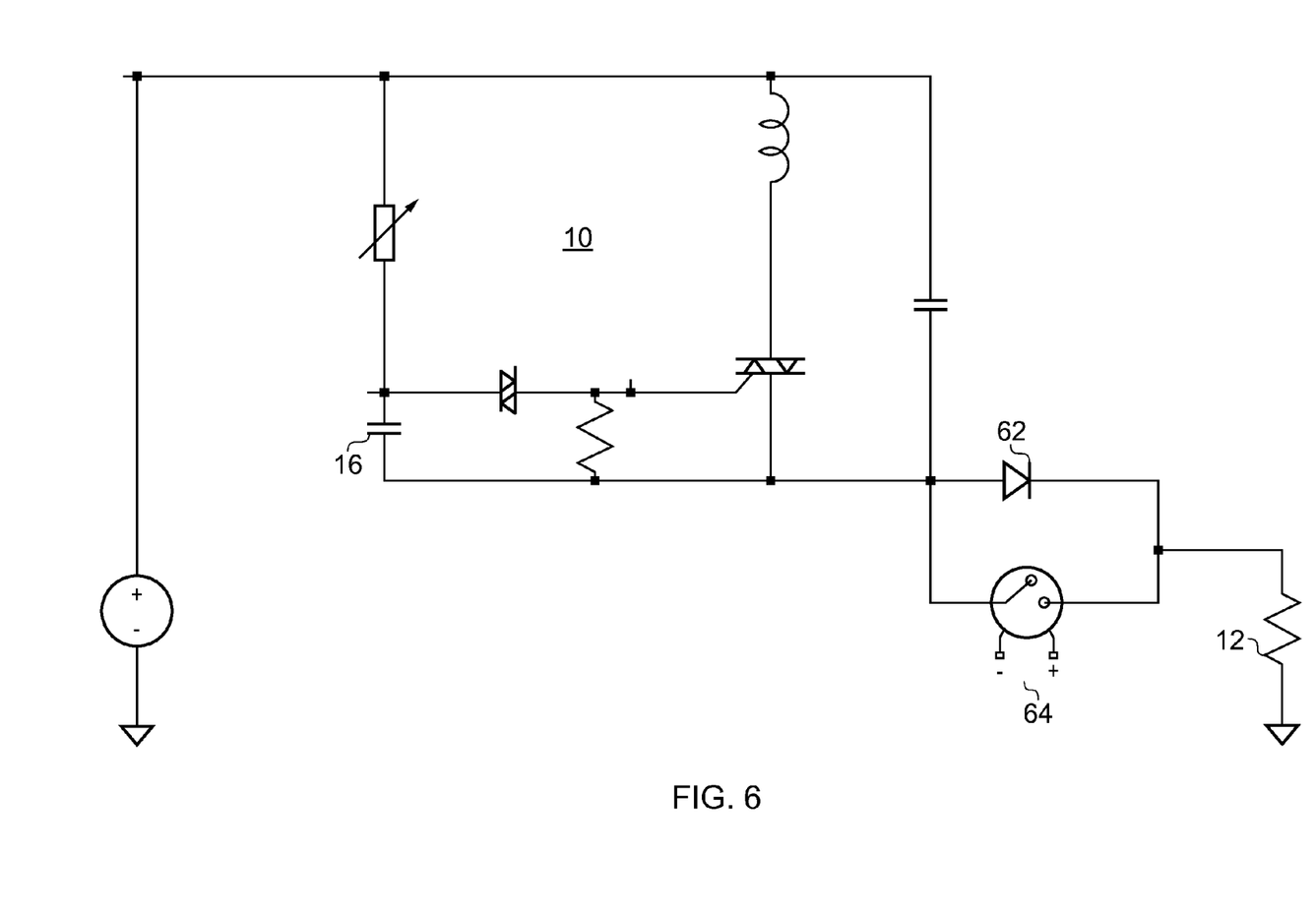
FIG. 6 shows a general schematic of embodiments.

FIG. 6 shows a general schematic of embodiments. The figure shows a dimmer circuit 10, connected in series with a load 12. Also connected in series with the load and the dimmer, is a diode 62 which provides half-bridge rectification, and which may be bypassed by means of a switch 64. In normal operation the bypass switch is closed, and the circuit operates the same way as a conventional dimmer circuit. However in circumstances where a deadlock situation is detected, as will be described in more detail hereinbelow, the switch is opened, so the charging current for the timing capacitor 16 is rectified, such that it is no longer AC but is direct current or DC. Thus, upon operation of the rectification, the timing capacitor is only charged in one direction. Thereby, even if there is an initial "wrong polarity" charge on the capacitor, the charge flowing to the capacitor will first discharge this wrong polarity charge, and then charge the capacitor only in the reverse direction. Even if the charge placed onto the capacitor is insufficient to reach the trigger voltage during this half cycle, during the following half cycle the capacitor will not be discharged, and then during the next subsequent half cycle more charge will be placed onto the capacitor; the voltage across the capacitor will thus ratchet up in a single direction, until the trigger voltage is achieved. Once the trigger voltage is achieved, the diac and triac will be switched on, thereby resetting the capacitor charge, and normal operation is resumed.

Although a diode is shown in FIG. 6 as the means by which the DC current is applied to the timing capacitor, it will be appreciated that this is not the only method of supplying a DC current and alternatives may be envisaged, for instance, and without limitation a synchronously rectified transistor may be used, or the body diode of a MOSFET as will be described in a further embodiment hereinbelow.

The diode, or other means of providing a DC current, thus provides an activation mechanism to exit the deadlock state. Normal operation may be resumed.

Figure 7A:
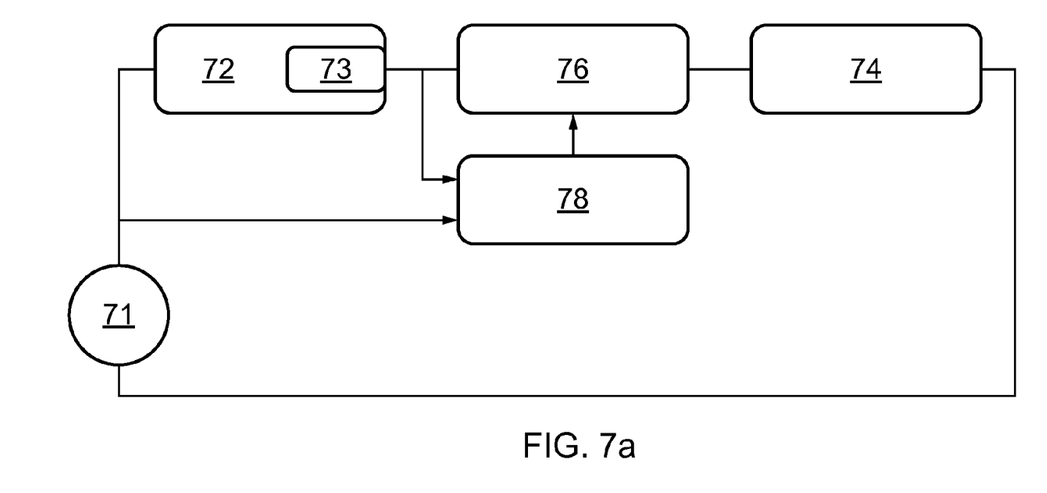
FIG. 7a shows a diagram of an embodiment.

FIG. 7a shows a block diagram of embodiments. The block diagram comprises a load 72 which may comprise a control 73 and which is coupled to the dimmer 74 by means of an activator 76 which may include or have associated with it a diode as described above. An AC supply 71 is connected across the load and dimmer. A detection block 78 is connected across the load in order to monitor the voltage across the load. The detection circuit is coupled to the activator 76 in order to activate the activator should the detection circuit 78 detect an under-voltage in the load.

The block schematic shown in FIG. 7a is based on sensing the voltage across the load. However, the detection is not limited to this mechanism, and other solutions are possible, such as, without limitation, voltage sensing across the dimmer, or sensing of the current through the load, activator, dimmer, or mains current.

Figure 7B:
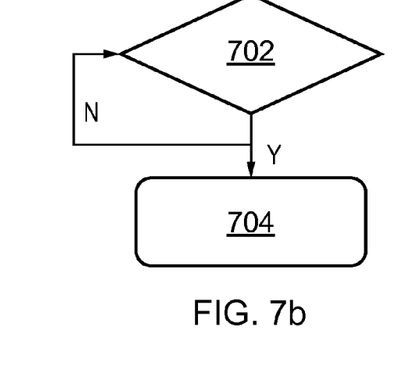
FIG. 7b shows a diagram of a method according to embodiments.

FIG. 7b shows a block diagram of the method according to embodiments. The method comprises, at 702 a detection step comprising detecting a deadlock state of the dimmer; and at 704 in response to the detection circuit detecting a deadlock state of the dimmer, an activation step comprising supplying a DC current to the dimmer to exit the deadlock state by activating the dimmer.

Figure 8:
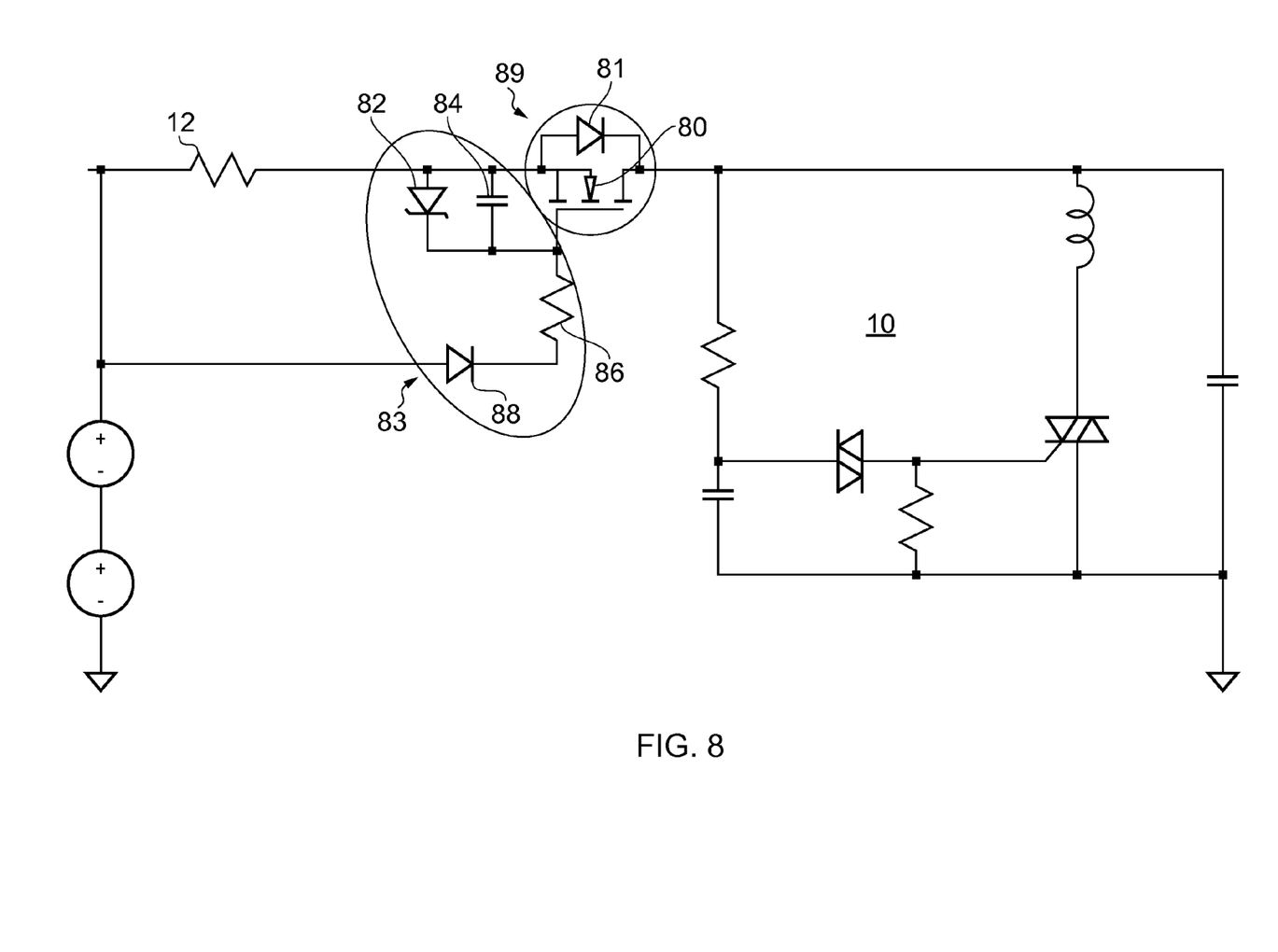
FIG. 8 shows a basic circuit diagram of an embodiment.

FIG. 8 shows a basic circuit diagram of an embodiment. The circuit includes a conventional dimmer 10, in series with a load 12, and having therebetween an actuator 89. The actuator comprises a MOSFET 80, having its main, source and drain, terminals connected to the load 12 and dimmer 10 respectively. The body diode 81 of the MOSFET 80 is explicitly shown in this figure. A detection circuit 83 comprises a Zener diode 82 in parallel with a capacitor 84 between the drain and gate of the MOSFET. The gate is also connected, via a series combination of a resistor 86 and diode 88 to the other side, that is to say the other terminal, of the load 12. The detection circuit operates to detect if the triac has recently been operated: when the triac of the dimmer is inactive, no current flows through the load, so the voltage across the load is zero, and as consequence the gate terminal of the MOSFET remains low, so the MOSFET remains in the off-state. At the moment the triac starts conducting a rectified current will flow through the body diode of the MOSFET. This results in a positive voltage across diode 88 and resistor 86. The capacitor 84 in parallel with the gate becomes charged and the MOSFET switches to the conductive state. During normal operation the MOSFET remains in the active state, as the gate voltage remains high.

In particular, the detection circuit detects whether the triac has been operated in, say, the last 10 ms: if the triac has been operated, the dimmer may be assumed to be in the normal operating mode; if the triac has not been operated, and at the same time no current is detected, the dimmer may be assumed to be switched off; however if the triac has not operated but a low current, which may be for instance 0.5 mA, is detected, it may be assumed that the dimmer unintentionally is not operating, for instance due to a temporary low AC supply voltage The activation block consists of the switch 80 and a bypass diode 81 which may typically, but not necessarily, be formed from the body diode of the switch 80, as shown. In normal operation the switch is "on", and the activation block provides a direct connection from the dimmer to the load; in the off state, when the dimmer is assumed to be switched off, no power is supplied to the activation block; in the circumstances of a potential deadlock, when the triac is found to be unintentionally not operating, a small current flows, and the activation block is switched to single sided rectification. In the example shown in FIG. 8, this is effected by the current through the body diode 81 of the switch 80.

Figure 9:
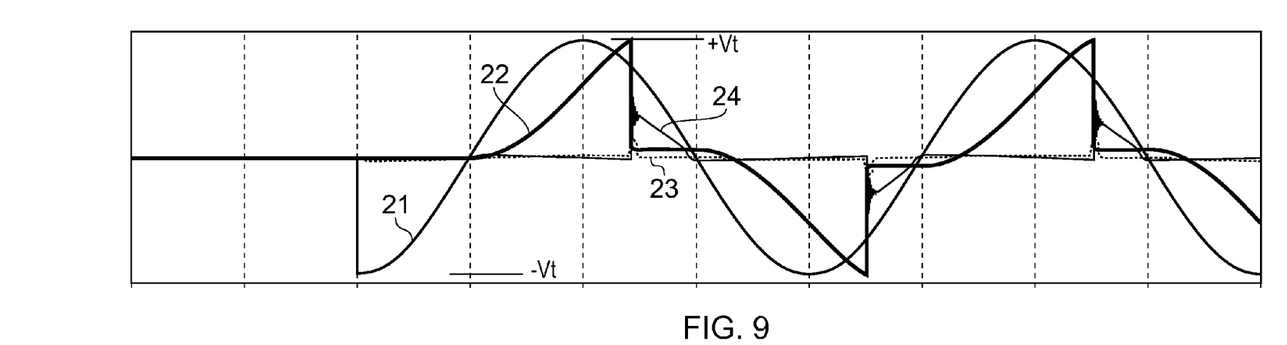
FIG. 9 shows waveforms associated with the embodiment of FIG. 8.

FIG. 9 shows waveforms associated with the embodiment of FIG. 8, according to simulations. The figure shows the AC supply voltage 21, the voltage at the input to the diac 22, which also corresponds to the voltage Vc across the capacitor 16, the gate voltage 23 of the triac 13, and the current 24 through the load 12.

As shown in FIG. 9, the triac does not fire during the initial (negative) part of a half cycle; however, it is immediately started in the first full positive half cycle. In comparison with FIG. 4, the capacitor is not charged during the part of the negative half cycle, so there is no charge on the capacitor to be discharged during the first positive half cycle so, as shown, the voltage across it reaches the trigger voltage Vt during that half cycle. Once the triac starts operating, the circuit remains active in a stable way, similarly to that shown in FIG. 3.

As can be seen from the figure, in this example the conduction angle is low, since in stable operation, so the triac is not triggered until approximately 135°

Thus the circuit enables starting of the triac, even at very low conduction angles, and this starting is independent of the phase angle of the mains voltage at the moment of switching on.

The skilled person will appreciate that the switch with its embedded body diode is one approach of providing single sided rectification in order to supply a DC current, and that alternatives approaches exist. Without limited limitation, these alternatives include: (1) shorting the timing capacitor, or grounding the inputs to the diac (or other phase-cutting switching), until a zero crossing of the A/C supply is detected; and (2) controlling an input-side bridge rectifier but that is switched off in one direction switched on again as soon as the triac starts operating.

Figure 10:
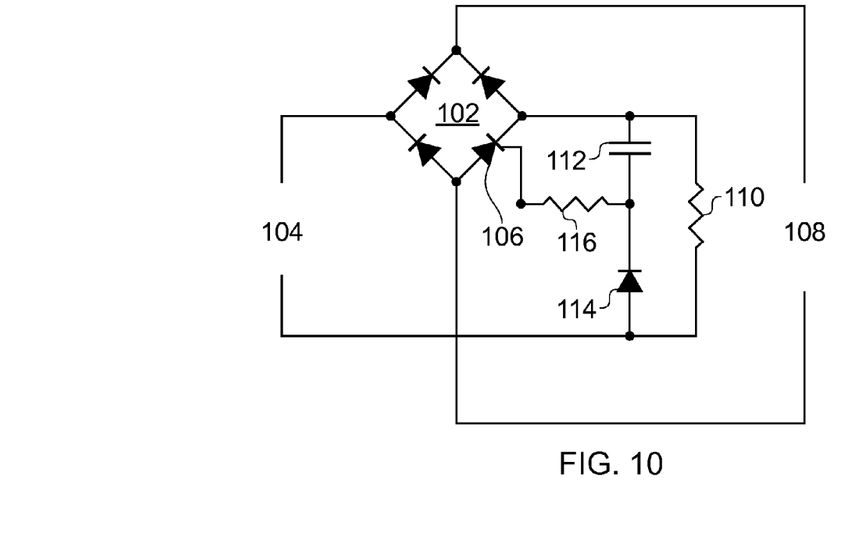
FIG. 10 shows a basic circuit diagram of an activator according to another embodiment.

This latter example is particularly suited for energy-saving lamps with electronic lamp drivers, or other electronic loads. FIG. 10 shows a basic circuit diagram of such an embodiment: the figure shows a bridge input circuit of an electronic lamp driver with an activator circuit incorporated in the rectifier bridge of the lamp driver. The input 104 to the bridge rectifier is the output from a leading-edge phase-cut dimmer circuit; for the sake of definiteness, but without limitation, the dimmer circuit will be considered as having a triac as phase-cutting switch. The bridge rectifier 102 includes a thyristor 106 in at least one arm. A resistor 110 is connected across the input 104, in parallel with a series connection of a diode 114 and a capacitor 112. The node between the diode 114 and capacitor 112 is connected, via a second resistor 116, to the control terminal (gate) of the thyristor 106.

If the dimmer does not trigger the triac, the thyristor in the bridge rectifier remains inactive, resulting in a DC current through the dimmer and the load 108. As a result, the timing capacitor in the dimmer will be charged by the DC current until the triggering voltage is reached to trigger the triac, which may be, as shown above, via a triggering device such as a diac. Once the triac is conducting, the voltage drop across the resistor 110 causes the capacitor 112 to be charged via diode 114, and thus the thyristor 106 is activated. Thereafter, the bridge 102 acts as a double sided rectifier; the dimmer starts operating continuously, and the load is powered by the dimmer corresponding with the setting of the dimmer. Thus in this embodiment, capacitor 12 together with diode 114 and resistor 116 comprise the detector circuit for detecting a deadlock state.

It will be appreciated, that this embodiment may be cheaper than the embodiments described supra, since typically thyristors are less expensive than MOSFETs; however, typically a thyristor based solution may be less efficient in that it may consume more energy.

In some applications, two or more loads can be connected to the same dimmer circuit. If the conditions which could result in a deadlock situation occur in such an application, it may be possible that the bleed current through the load may not be sufficient to properly charge a timing capacitor to its triggering voltage Vt, since it may be possible that the first load draws a positive current and the second load draws a negative current. Such applications, it may be necessary to include circuitry in order to ensure that only a DC current (that is to say current in only one direction) is applied to the timing capacitor. This may be particularly the case in embodiments wherein the activator is incorporated into the load, such as that described with reference to FIG. 10 above.

It will be appreciated, that as used herein, the term "deadlock" should be interpreted broadly, and is not limited to a full, permanent, or inescapable, deadlock situation. Rather, the deadlock may be temporary or nascent, such that embodiments may provide methods by which the deadlock may be exited, or a nascent deadlock does not mature into a permanent deadlock. In other words, as used herein, "deadlock" may be considered to be synonymous with "non-triggering without being completely switched off". Thus in embodiments, the detector circuit detects an emerging deadlock, and the activator circuit is effective at preventing a full deadlock status arising.

From reading the present disclosure, other variations and modifications will be apparent to the skilled person. Such variations and modifications may involve equivalent and other features which are already known in the art of dimmer circuits, and which may be used instead of, or in addition to, features already described herein.

In particular and without limitation, although the example embodiments above have been described with reference to lighting applications, the invention is not limited thereto, and may be used with other applications such as fans or motors, operable with phase cut dimmer circuits. Furthermore, although the example embodiments have in general referred to mains as the AC supply, the invention is not limited thereto, and may be applicable with other AC supplies, such as without limitation AC power supplies resulting from inverted DC supplies, for instance as may be used on board motor transport vehicles, boats, yachts, aeroplanes, and the like.

It will further be appreciated, that although embodiments above have been described with reference to a triac as the switching device for the dimmer, the invention is not limited thereto in particular, and without limitation also the thyristor, bipolar transistor, Power MOSFET, and the IGBT are examples of applied switching devices for dimmers, which may be used with embodiments of the invention. Thus where the triac is mentioned herein, other electronic power switches are possible (sometimes with an adaptation of the control electronics).

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A control circuit, for lighting applications having a load and an AC leading-edge phase-cut dimmer comprising a phase-cutting switch, the circuit comprising:
   a detection circuit for detecting a deadlock state of the dimmer; and
   an activation circuit configured to, in response to the detection circuit detecting a deadlock state of the dimmer, supply a DC current to the dimmer to exit the deadlock state by activating the dimmer.

2. A control circuit as claimed in claim 1, wherein in the deadlock state, the voltage at a control terminal of the phase-cutting switch does not reach a predetermined trigger level required to turn on the switch.

3. A control circuit according to claim 1, wherein supplying a DC current to the dimmer comprises increasing a voltage at the control terminal of the phase-cutting switch.

4. A control circuit as claimed in claim 1, wherein the detection circuit is configured to sense a voltage across the load.

5. A control circuit as claimed in claim 1, wherein the detection circuit is configured to sense a voltage across the dimmer.

6. A control circuit as claimed in claim 1, wherein the detection circuit is configured to sense a current through at least one of the group consisting of the load, the dimmer, and the activation circuit.

7. A control circuit as claimed in claim 1, configured for use with an AC leading-edge phase-cut dimmer, wherein the phase of the leading edge is determined by a timing capacitor.

8. A control circuit as claimed in claim 7, wherein the detection circuit is configured to detect the voltage on the timing capacitor.

9. A control circuit as claimed in claim 1, wherein the activation circuit comprises a semiconductor switch arranged to be, in use, electrically coupled in series with the phase-cut dimmer and the load and is configured so as to supply the DC current when the switch is open.

10. A control circuit as claimed in claim 9, wherein the activation circuit is configured to supply the DC current by at least half-rectifying the AC supply by means of a body diode of the semiconductor switch.

11. A control circuit as claimed in claim 1, further comprising a load driver circuit which is comprised in the load, wherein the detection circuit and the activation circuit are comprised in the load driver circuit and the detection circuit detects a voltage across the load.

12. A control circuit as claimed in claim 11, wherein the activation circuit comprises a thyristor comprising one leg of a bridge rectifier.

13. An AC phase-cut dimmer circuit comprising a control circuit as claimed in claim 1 and a phase-cutting switch, wherein the phase-cutting switch is one of the group consisting of a triac, a thyristor, a bipolar transistor, a power MOSFET and an IGBT.

14. A lighting application comprising an AC phase-cut dimmer circuit as claimed in claim 13.

15. A method of controlling a dimmer circuit for lighting applications and comprising a dimmer comprising a phase-cutting switch;

the method comprising detecting a deadlock state of the dimmer by means of a detection circuit; and, in response to the detection circuit detecting a deadlock state of the dimmer, supplying a DC current to the dimmer.

\* \* \* \* \*